June 14, 1966 R. ANDERSON ET AL 3,255,628
RATING GEAR DESIGNS
Filed Dec. 11, 1963

INVENTORS
Richard Anderson &
BY Herman E. Weidner

A. M. Heiter
ATTORNEY

United States Patent Office 3,255,628
Patented June 14, 1966

3,255,628
RATING GEAR DESIGNS
Richard Anderson, Indianapolis, and Herman E. Weidner, New Castle, Ind., assignors to General Motors Corporation, Detroit, Mich., a corporation of Delaware
Filed Dec. 11, 1963, Ser. No. 329,738
21 Claims. (Cl. 73—162)

This invention relates to gear designing and more particularly to methods and apparatus providing ratings of gear designs.

New and improved methods for the rating of gear designs and constantly being sought since present day methods are generally complex in procedure, require long periods of running time and inspection time which can be greatly prolonged where microscopic rating of each gear tooth is made and depend on operator judgment and temperament for rating accuracy, to name a few.

Clearly observable indicia of satisfactory gear performance for example is the absence of scuffing on the gear teeth and correspondingly unsatisfactory gear performance is observable by the occurrence of scuffing. Gear designers generally consider a gear to have failed if any scuffing occurs whatsoever at a given load, and, therefore, an arcuate rating for any given gear design would be the stress loading just below the stress loading at which observable scuffing first occurs.

This invention provides a method for obtaining comparative ratings of gear design parameters such as surface finishes, process of manufacture, materials, surface coatings and the like, using for example scuffing as the rating criteria and employing constant tangential loading on meshing test gears and variable stress level loading at the points of gear contact.

A preferred form of apparatus for carrying out the methtod of this invention comprises generally a gear loading machine operating on the so-called "four square" principle. Two parallel shafts are connected by two meshing slave gears and two meshing test gears to form a "square" so that the power input to one of the shafts to operate the machine is only that required to overcome the friction losses in the gears and bearings. The slave gears are helical gears and integral with the shafts while the test gears are spur gears which are detachably secured to the shafts. Load on the test gears is obtained by fluid operated motors which when supplied with fluid pressure cause axial movement of one shaft relative to the other. Since the slave gears are helical gears, relative rotational or angular movement occurs between these gears and a torsional load, which is proportional to the fluid pressure acting in the fluid motors, is thus applied to the shafts and the attached test gears.

One of the test gears has a constant tooth face width while the other test gear, which is designated as the rating test gear, has a variable tooth face width which preferably tapers from a maximum tooth face width to a minimum tooth face width so that the stress level resulting from the applied tangential load varies from tooth to tooth of the rating test gear as it is caused to rotate in mesh with the test gear having the constant tooth face width.

The test gears are run at a selected speed and under a predetermined constant tangential load for a given interval of time during which time scuffing for example will occur on a portion of the teeth of the rating test gear. The rating test gear is then removed and the transition at which scuffing to nonscuffing occurred on the teeth of this gear is noted. A micrometer measurement is then taken of the narrowest tooth face width at the observed transition which did not scuff and this tooth face width is used as the comparative design rating for this gear. From this measurement and knowing the tangential load, these quantities can be applied to a suitable stress formula to determine the stress level at which a similar gear having a constant tooth face width the same or at least as wide as the measured unscuffed tooth can be run without scuffing under the same operating conditions. To compare different gear designs, test gears having the same shape and size but with different surface finishes and the like are operated under the same operating conditions and the narrowest unscuffed tooth face widths are compared for evaluating the different gear designs. Where the rating gear is symmetrical about a diameter and tapered to have the widest tooth at one end and the narrowest tooth at the other end of this diameter, the rating gear gives two transitions from scuffed to unscuffed, one on each side of this diameter. Both the rating gear and test gear may be reversed on their shafts to provide two additional transitions. The mean of the four narrowest unscuffed tooth widths which were proceeded by a scuffed tooth at the four transitions of initially occurring scuffing may then be taken as the rating of the gear design.

An object of this invention is to provide an improved method and apparatus for rating gear designs.

Another object of this invention is to provide apparatus for rating gear design parameters comprising rotatably mounted meshing test gears one of which has a variable tooth face width and means to drive the test gears under a constant tangential load.

Another object of this invention is to provide a method to give ratings of gear designs comprising the obtaining of the transitions between tooth failure and no tooth failure of a variable tooth face width test gear in mesh with a second test gear under constant tangential loading to ascertain the stress level at which a gear having a constant tooth face width can be run without tooth failure.

Another object of this invention is to provide a method for rating gear designs comprising the running of meshing test gears under a constant tangential load and with variable stress level loading on the teeth of one of the gears to obtain transitions between failure and no failure of the teeth on the one gear and using one of the teeth of the one gear which did not fail as a rating of the one gear.

Another object of this invention is to provide a method for rating gear design parameters comprising the driving of a pair of meshing test gears at a predetermined speed and tangential load for a given interval of time with one of the gears having a constant tooth face width and the other gear having a tapered tooth face width and then observing the transitions on the teeth of the other test gear at which tooth failure initially occurred and obtaining the measurements of the narrowest teeth on the other test gear which did not fail to determine the stress level at which a similar gear having a constant tooth face width at least the width of the narrowest teeth which did not fail can be run without tooth failure and using these measurements as a comparative rating of the gear design.

These and other objects of this invention will be more apparent from the following description and the drawing which shows a preferred form of apparatus for carrying out the method of this invention.

Figure 1:
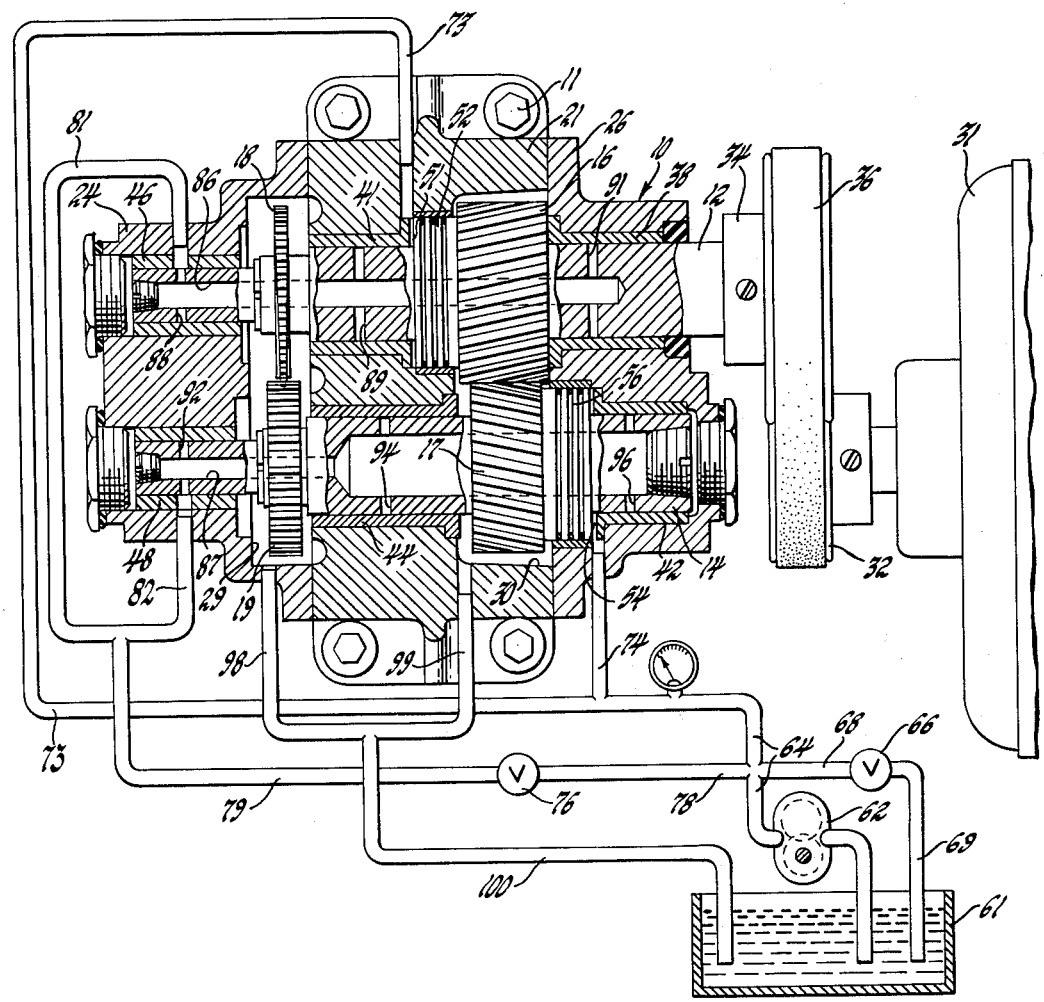
FIGURE 1 is a plan view of a preferred form of apparatus for carrying out the method of this invention.

The preferred apparatus for carrying out this method of invention is shown in FIGURE 1 and comprises a gear test machine generally designated at 10 rigidly secured by bolts 11 to a suitable stationary support. The machine 10 operates on the so-called "four square" principle and generally comprises two parallel shafts 12 and 14 connected by two meshing slave gears 16 and 17 and two meshing test gears 18 and 19 to form a "square" so that the power required to operate the machine is only that required to overcome the friction losses in the gears and bearings.

The machine 10 is comprised of three housing members, namely, a main body housing 21, a left-hand end housing 24 detachably secured to the left-hand end face of main body housing 21 and a right-hand end housing 26 detachably secured to the right-hand end face of main body housing 21. The left-hand end housing 24 is suitably recessed to provide a chamber or cavity 29 to accommodate the test gears 18 and 19 and the main body housing 21 is suitably recessed to provide a separate chamber or cavity 30 to accommodate the slave gears 16 and 17.

A constant speed motor 31 provides power input to drive the shaft 12 which is the driving shaft and for that purpose has a pulley 32 drive connected to a pulley 34 rigidly secured to driving shaft 12 by a V-belt 36.

The driving shaft 12 is located endwise between shoulder of a right-hand bushing 38 mounted in housing 26 and an intermediate bushing 41 mounted in housing 21. Shaft 14 which is the driven shaft is located endwise between the shoulder of a right-hand bushing 42 mounted in housing 26 and an intermediate bushing 44 mounted in housing 21 with there being clearance provided between the left-hand end face of slave gear 17 and the shoulder of bushing 44 to permit limited freedom of movement of slave gear 17 in the leftward direction. The left-hand end of driving shaft 12 has a reduced diameter and is rotatably supported by a left-hand bushing 46 mounted in housing 24. Similarly, the left-hand end of driven shaft 14 has a reduced diameter and is rotatably mounted by a left-hand bushing 48 also mounted in housing 24.

Figure 2:
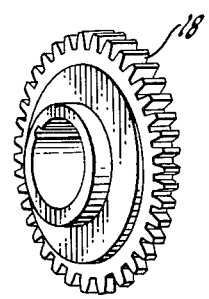
FIGURE 2 is a perspective view of the variable face width rating gear used in the apparatus shown in FIGURE 1.

The slave gears 16 and 17 are helical gears made integral to the shafts 12 and 14 respectively. The test gears 18 and 19 are rigidly and detachably secured to the reduced diameter ends of shafts 12 and 14 respectively and are spur gears with the test gear 19 having a constant tooth face width and the test gear 18, which is referred to as the rating test gear, preferably having a variable tooth face width tapered a shown in FIGURE 1 and FIGURE 2. The maximum tooth face width of the rating test gear 18 is diametrically opposite the minimum tooth face width and the even progression of decreasing tooth face width from the maximum tooth face width in both circumferential direction towards the minimum tooth face width is identical to provide symmetry.

To apply a tangential load to the test gears, the main body housing 21 is suitably recessed to provide a chamber 51 in which operates a piston 52 integral with the driving shaft 12 and the right-hand end housing 26 is suitably recessed to provide a chamber 54 in which operates a piston 56 integral with the driven shaft 14. When fluid pressure is supplied to the chambers 51 and 54, the pistons 52 and 56 cause leftward axial movement of the driven shaft 14 relative to the driving shaft 12. Because the slave gears 16 and 17 are helical gears, there occurs relative rotation or angular movement between these gears and a torsional load is thus applied on the shafts 12 and 14 thereby tangentially loading the test gears 18 and 19. Knowing the helix angle of the helical gears 16 and 17, the fluid pressure acting on the pistons 52 and 56 and the areas of these pistons, the torsional load on the shafts may be calculated to find the tangential load acting on the test gears.

Oil to load the test gears and to lubricate the working parts of the gear test machine is provided by the load and lubricant oil system shown in FIGURE 1. The fluid system is supplied with fluid collected in a sump 61 which is conveniently located at an elevation lower than the gear test machine 10. A pump 62 when operating takes fluid from the sump and supplies it to a main line 64 where it is maintained at a constant pressure by main line regulator valve 66 in a branch line 68 which is connected to the main line 64. The regulator valve 66 is adjustable to different selected oil pressure settings and exhausts oil overage by return line 69 to the sump. From the main line 64 the oil pressure is delivered via branch supply lines 73 and 74 to the chambers 51 and 54 respectively.

A lubricant control valve 76 connected by a branch line 78 to main line 64 routes a portion of the oil in the main line to a lubricant supply line 79 at a controlled rate of flow and pressure. Oil in lubricant supply line 79 is delivered via branch lubricant supply lines 81 and 82 through the left-hand end housing 24, the bushings 46 and 48 respectively to centrally located closed end passages 86 and 87 in shafts 12 and 14 respectively. Oil in passage 86 is delivered by ports 88 to lubricate the bushing 46, ports 89 to lubricate the bushing 41 and ports 91 to lubricate the bushing 38. Oil in passage 87 is delivered by ports 92 to lubricate bushing 48, ports 94 to lubricate bushing 44 and ports 96 to lubricate bushing 42. In addition, provision is made for oil pressure consisting of one or more squirts to be played on the meshing test gear teeth. Lubricant oil collecting in the cavity 29 containing the test gears 18 and 19 and cavity 30 containing the slave gears 16 and 17 and is returned via branch lines 98 and 99 respectively to a main return line 100 which exhausts to the sump 61.

If the Hertz crushing stress formula shown below is used to determine the stress level at gear contact, it is readily observable that for a given gear design only the load or the tooth face width can be varied with ease to effect different stress levels.

$$\text{Crushing stress} = S_c = \left[ \frac{10.5 \times 10^6 W_t}{\cos \phi \sin \phi F_d} \left( \frac{m_G + 1}{m_G} \right) \right]^{1/2}$$

where $W_t$ = tangential load at pitch diameter
$F$ = face width
$\phi$ = pressure angle at pitch diameter
$d$ = pitch diameter
$m_G$ = gear ratio An accurate rating for gear designs is the load or stress level just below the load or stress level at which failure initially occurs. Varying the load to observe indicia of failure at particular stress levels where the gear design being tested has a constant tooth face width requires shutting down the gear test machine after runs at each particular stress level to remove the test gears and observe where the scuffing occurs to determine gear performance. This is undesirable because of the incremental running time and inspection time involved in obtaining a rating for the gear design.

In the method of this invention the tooth face width of one of the test gears, namely, rating test gear 18 is varied so that the stress at one constantly applied tangential load will vary from stress levels which give an indicia of failure such as scuffing to stress levels which do not give scuffing during a given interval of running time. If the quality of the test gears and the load are constant, a definite and repeatable transition between scuffing and nonscuffing of the gear teeth on the rating test gear will result. The narrowest unscuffed tooth face width on the rating test gear at which a transition from scuffing to nonscuffing occurs then serves as the comparative rating of the gear design and can be used to design a similar gear having a constant tooth face width which can be run under similar load conditions without scuffing.

To illustrate the procedure in testing it is first estimated, using the Hertz crushing stress formula for example, over what stress range initial scuffing will most likely occur for a given gear design. Suitable maximum and minimum tooth face widths for the rating test gear are then determined from which the oil pressure acting on the pistons 52 and 56 may be determined to provide the required tangential load to effect the predetermined stress range during each revolution of the rating test gear 18. The highest stress level is not permitted however to exceed a stress level which causes more serious damage such as breaking off a tooth. Knowing the constant tangential load, it is then possible to solve the Hertz crushing stress formula to find the crushing stress at each tooth face width and this crushing stress versus tooth face width relationship may be plotted on a graph. The test gears 18 and 19 are mounted on the shafts 12 and 14 respectively and are run at a constant selected speed under the predetermined load for a given interval of time. The test gears 18 and 19 are then removed and the transition on the gear teeth of the rating test gear 18 at which scuffing initially occurred is observed. Because of the tooth face symmetry of the rating test gear 18, there will have occurred two transitions at which scuffing initially occurs. A micrometer measurement is then taken of the narrowest tooth face width which did not scuff at one or both of the transitions between scuffing and nonscuffing. One of these measurements or the mean of both of these measurements is then referred to the graph previously mentioned or is applied directly to the stress formula to determine the stress level at which the gear can run without scuffing under similar speed, load and running conditions if all its teeth had tooth face widths at least the width of one of the narrowest unscuffed teeth or the mean of the narrowest unscuffed teeth. The rating test gear 18 may be tested on both sides to give a total of four transitions between scuffing and nonscuffing per test run for greater accuracy if desired; two from each gear side because of gear symmetry and two by reversing the rating test gear 18 on shaft 12 and reversing the test gear 19 on shaft 14.

A comparison of different gear designs having the same shape and size but with different surface finishes, processes of manufacture, materials, surface coatings and the like is made by operating sets of test gears corresponding to each gear design under the same speed, load and running conditions. The narrowest unscuffed tooth face widths of the rating test gear of each set of test gears are then compared for evaluating the different gear designs.

To demonstrate the invention, scuffing has been used as an indicia of tooth failure. It is understood that all types of indicia of tooth failure such as scuffing, pitting, gallin, spalling, stress cracking and the like, or combinations thereof may occur during testing and thus provide a basis for comparison of the gears.

Also variations in loading and the metallurgy and manufacture of the gears will tend to provide certain of these indicia of failure as opposed to other of these indicia of failure.

It is thus readily apparent that no microscopic rating of each tooth is necessary and that only one run at one load will be necessary to determine the rating and not a series of runs at different loads. The ratings are more accurate since operator judgment and temperament are considerably reduced in that constant loading is maintained throughout the single test run and there is no need for successive runs, and furthermore, better operator versatility is available since a less-skilled operator with less experience can be used. Furthermore the rating is in a more useful form since the gear designer can use information directly from the rating test gear for actual gear designs and design comparisons.

The above-described method of this invention is illustrative of this invention and it will be appreciated by those skilled in the art that modifications may be made in accordance with the scope of the appended claims.

We claim:

1. A method of rating gear designs comprising the steps of
   (a) driving a first gear having a variable tooth face width in mesh with a second gear under a constant tangential load condition,
   (b) running the gears until at least one tooth of the first gear performs unsatisfactorily,
   (c) and using one of the teeth of the first gear which did perform satisfactorily as a comparative design rating for this gear.

2. A method of rating gear designs comprising the steps of
   (a) driving a first gear having a variable tooth face width tapered symmetrically to a plane at right angles to the axis of the first gear in mesh with a second gear under a constant tangential load condition,
   (b) running the gears until at least one tooth of the first gear performs unsatisfactorily,
   (c) and using one of the teeth of the first gear which did perform satisfactorily as a comparative design rating for this gear.

3. A method for rating gear designs comprising the steps of
   (a) driving a first gear which is symmetrical about a diameter and evenly tapered to have its widest tooth face width at one end of said diameter and its narrowest tooth face width at the opposite end of said diameter in mesh with a second gear under a constant tangential load condition,
   (b) running the gears until at least one tooth of the first gear performs unsatisfactorily,
   (c) and using one of the teeth of the first gear which did perform satisfactorily as a comparative design rating for this gear.

4. A method for rating gear designs comprising the steps of
   (a) driving a first gear having a variable tooth face width in mesh with a second gear under a constant tangential load condition,
   (b) running the gears until at least one tooth of the first gear performs unsatisfactorily,
   (c) and using the narrowest tooth of the first gear which did perform satisfactorily as a comparative design rating for this gear.

5. A method for rating gear designs comprising the steps of
   (a) driving a pair of meshing gears, one of which has a variable tooth face width under a constant tangential load condition,
   (b) running the gears until a portion of the teeth on the one gear performs unsatisfactorily,
   (c) and using one of the teeth of the one gear which did perform satisfactorily as a design parameter in designing a similar gear which may be run under similar load condittions with satisfactory tooth performance.

6. A method for rating gear designs comprising the steps of
   (a) driving a pair of meshing gears, one of which has a variable tooth face width under a tangential load condition,
   (b) running the gears until indicia of tooth failure occurs on a portion of the teeth of the one gear,
   (c) and measuring the narrowest tooth of the one gear which did not fail to determine the stress level at which a similar gear having teeth at least the width of the narrowest tooth may be run under similar load conditions without tooth failure.

7. A method for rating gear designs comprising the steps of
   (a) meshing a first gear having a variable tooth face width with a second gear having a minimum tooth face width at least as large as the maximum tooth face width of the first gear,
   (b) driving the meshing first and second gears at a constant speed, (c) applying a constant tangential load to the meshing first and second gears,
(d) running the meshing first and second gears until indicia of tooth failure occurs on a portion of the teeth of the first gear,
(e) and using the width of one of the teeth of the first gear which did not fail as a design rating for this gear to determine the stress level at which a similar gear having teeth the width of the one tooth which did not fail will operate without tooth failure under similar speed, load and running conditions.

8. A method for rating gear designs comprising the steps of
(a) meshing a first gear having a variable tooth face width with a second gear having a minimum tooth face width at least as large as the maximum tooth face width of the first gear,
(b) driving the meshing first and second gears at a constant speed,
(c) applying a constant tangential load to the meshing first and second gears,
(d) running the meshing first and second gears until indicia of tooth failure occurs on a portion of the teeth of the first gear,
(e) and using the width of the narrowest tooth of the first gear which did not fail as a design rating for this gear to determine the stress level at which a similar gear having teeth the width of the one tooth which did not fail will operate without tooth failure under similar speed, load and running conditions.

9. A method for rating gear designs comprising the steps of
(a) meshing a first gear having a tapering tooth face width symmetrical to a plane at right angles to the axis of the first gear with a second gear having a constant tooth face width at least as wide as the narrowest tooth face width of the first gear,
(b) driving the meshing first and second gears at a constant speed,
(c) applying a constant tangential load to the meshing first and second gears,
(d) running the meshing first and second gears until indicia of tooth failure occurs on a portion of the teeth of the first gear leaving two transitions between teeth which failed and teeth which did not fail,
(e) and using the means of the narrowest teeth which did not fail at the two transitions as a comparative design rating for the first gear.

10. A method for rating gear designs comprising the steps of
(a) meshing a first gear having a tapering tooth face width symmetrical to a plane at right angles to the axis of the first gear with a second gear having a constant tooth face width at least as wide as the narrowest tooth face width of the first gear,
(b) driving the meshing first and second gears at a constant speed,
(c) applying a constant tangential load to the meshing first and second gears,
(d) running the meshing first and second gears until indicia of tooth failure occurs on a portion of the teeth of the first gear leaving two transitions between teeth which failed and teeth which did not fail,
(e) and using the means of the two narrowest teeth which did not fail at the two transitions as a comparative design rating for the first gear and to determine the stress level at which a similar gear having teeth at least the width of the mean of the two narrowest teeth which did not fail can operate without tooth failure under similar speed, load and running conditions.

11. A method of rating gear designs comprising the steps of
(a) detachably mounting a first gear having a variable tooth face width on one of two parallel shafts,
(b) detachably mounting a second gear having a constant tooth face width at least as wide as the narrowest tooth face width of the first gear on the other shaft and meshing the second gear with the first gear,
(c) driving the two shafts in opposite directions and at a constant speed,
(d) applying a constant torsional load to the two shafts and a constant tangential load to the meshing first and second gears,
(e) running the meshing first and second gears until indicia of tooth failure ocurs on a portion of the teeth of the first gear leaving a transition between teeth which failed and teeth which did not fail,
(f) and using the narrowest teeth which did not fail at the transitions as a comparative design rating for the first gear and to determine the constant tooth face width of a similar gear which will operate without tooth failure under similar speed, load and running conditions.

12. A method of rating gear designs comprising the steps of
(a) detachably mounting a first gear having a tapering tooth face width symmetrical to a plane at right angles to the axis of the first gear on one of two parallel shafts,
(b) detachably mounting a second gear having a constant tooth face width at least as wide as the narrowest tooth face width of the first gear on the other shaft and meshing the second gear with the first gear,
(c) driving the two shafts in opposite directions and at a constant speed,
(d) applying a constant torsional load to the two shafts and a constant tangential load to the meshing first and second gears,
(e) running the meshing first and second gears until indicia of tooth failure occurs on a portion of the teeth of the first gear leaving two transitions between teeth which failed and teeth which did not fail,
(f) and using the mean of the two narrowest teeth which did not fail at the two transitions as a comparative design rating for the first gear and to determine the constant tooth face width of a similar gear which will operate without tooth failure under similar speed, load and running conditions.

13. A method of rating gear designs comprising the steps of
(a) detachably mounting a first gear having a tapering tooth face width symmetrical to a plane at right angles to the axis of the first gear on one of two parallel shafts,
(b) detachably mounting a second gear having a constant tooth face width at least as wide as the narrowest tooth face width of the first gear on the other shaft and meshing the second gear with the first gear,
(c) driving the two shafts in opposite directions and at one constant speed,
(d) applying one constant torsional load to the two shafts and one constant tangential load to the meshing first and second gears,
(e) running the meshing first and second gears for a predetermined interval of time until scuffing occurs on a portion of the teeth of the first gear leaving two separate transitions between scuffed and unscuffed teeth,
(f) reversing the mounting of the one gear on the one shaft and reversing the mounting of the second gear on the other shaft,
(g) driving the meshing first and second gears at the one constant speed,
(h) applying the one constant torsional load to the two shafts and the one constant tangential load to the meshing first and second gears, (i) running the meshing first and second gears for the predetermined interval of time scuffing occurs on a portion of the teeth of the first gear leaving two more separate transitions between scuffed and unscuffed teeth, (j) and using the mean of the four narrowest unscuffed teeth at the four transitions as a comparative design rating for the first gear and to determine the constant tooth face width a similar gear which will operate without scuffing under similar speed, load and running conditions.

14. Apparatus for rating gear designs comprising
 (a) a pair of rotatably mounted shafts,
 (b) a first gear having a variable tooth face width fixed for rotation with one of said shafts,
 (c) a second gear fixed for rotation with the other of said shafts and in mesh with said first gear,
 (d) means to rotate one of said shafts,
 (e) and means operable to apply a constant tangential load to the meshing said first and second gears.

15. The invention defined in claim 14 and the first gear being symmetrical about a diameter and evenly tapered to have its widest tooth face width at one end of said diameter and its narrowest tooth face width at the opposite end of said diameter.

16. Apparatus for rating gear designs comprising
 (a) a pair of rotatably mounted shafts which are parallel to each other,
 (b) a first helical gear fixed for rotation with one of said shafts,
 (c) a second helical gear fixed for rotation with the other of said shafts and in mesh with said first helical gear,
 (d) a first test gear having a variable tooth face width fixed for rotation with one of said shafts,
 (e) a second test gear fixed for rotation with the other of said shafts and in mesh with said first test gear,
 (f) power input means to rotate one of said shafts,
 (g) and load control means operable to effect relative axial movement between said first and second helical gears to apply a constant torsional load to said shafts and a constant tangential load to the meshing said first and second test gears.

17. The invention defined in claim 16 and said first test gear being symmetrical about a diameter and evenly tapered to have its widest tooth face width at one end of said diameter and its narrowest tooth face width at the opposite end of said diameter to provide a stress level range in which satisfactory tooth performance occurs and unsatisfactory tooth performance discernible as scuffing occurs.

18. The invention defined in claim 16 and said first test gear being symmetrical about a diameter and evenly tapered to have its widest tooth face width at one end of said diameter to provide a stress level range varying from a stress level at which satisfactory tooth performance occurs to a stress level at which unsatisfactory tooth performance occurs below a stress level which causes tooth breakage.

19. The invention defined in claim 16 and the variable tooth face width of said first test gear being tapered symmetrical to a plane at right angles to the axis of said first test gear.

20. The invention defined in claim 16 and said load control means including hydraulically operated motor means operatively connected to said first and second helical gears.

21. A gear for testing gear designs symmetrical about a diameter and evenly tapered to have its widest tooth face width at one end of said diameter and its narrowest tooth face width at the opposite end of said diameter whereby the tooth face widths of said gear when under a predetermined constant tangential load will provide a stress level range varying from a stress level at which satisfactory tooth performance occurs to a stress level at which unsatisfactory tooth performance occurs below a stress level which causes tooth breakage.

No references cited.

LOUIS R. PRINCE, *Primary Examiner.*